(12) United States Patent
Adams

(10) Patent No.: US 12,000,425 B2
(45) Date of Patent: Jun. 4, 2024

(54) LOCKING THREADED FASTENER ASSEMBLY

(71) Applicant: Raytheon Company, Waltham, MA (US)

(72) Inventor: Richard J. Adams, Charlestown, MA (US)

(73) Assignee: Raytheon Company, Tewksbury, MA (US)

( * ) Notice: Subject to any disclaimer, the term of this patent is extended or adjusted under 35 U.S.C. 154(b) by 578 days.

(21) Appl. No.: 16/823,091

(22) Filed: Mar. 18, 2020

(65) Prior Publication Data
US 2021/0293268 A1 Sep. 23, 2021

(51) Int. Cl.
*F16B 39/10* (2006.01)
*F16B 39/24* (2006.01)

(52) U.S. Cl.
CPC ............ *F16B 39/108* (2013.01); *F16B 39/24* (2013.01)

(58) Field of Classification Search
CPC ........ F16B 39/108; F16B 39/24; F16B 39/08; F16B 37/14; F16B 39/105; F16B 39/106
See application file for complete search history.

(56) References Cited

U.S. PATENT DOCUMENTS

| | | | |
|---|---|---|---|
| 228,236 A | * | 6/1880 | Warren |
| 694,246 A | * | 2/1902 | Briggs |
| 938,880 A | * | 11/1909 | Lawson |
| 1,100,105 A | | 6/1914 | Thorson |
| 1,172,669 A | | 2/1916 | Caldwell |
| 1,220,129 A | | 3/1917 | Inglis |

(Continued)

FOREIGN PATENT DOCUMENTS

| | | | |
|---|---|---|---|
| CN | 2921414 Y | * | 7/2007 |
| CN | 2921414 Y | | 7/2007 |

(Continued)

OTHER PUBLICATIONS

Wenzhou Nanlong Din 127A split lock washer with bent ends web product page dated by archive.org to be: Feb. 21, 2019 (Year: 2019).*

(Continued)

*Primary Examiner* — Terrell L Mckinnon
*Assistant Examiner* — Ding Y Tan
(74) *Attorney, Agent, or Firm* — Schwegman Lundberg & Woessner, P.A.

(57) ABSTRACT

A locking fastener assembly comprising a fastener having a threaded portion, and a head having a first end and a second end axially spaced from the first end, the second end comprising a fastening surface and a locking washer recess. The locking fastener assembly further comprises a locking washer disposed at least partially within the locking washer recess, the locking washer comprising a locking tab extending in a first direction and a stop biased in a second direction opposing the first direction, wherein the locking tab is operable to lock rotation of the locking washer relative to an item being secured upon a torqueing rotation and a loosening rotation of the fastener. A locking member is supported by the fastener, and operable to interface with the stop of the locking washer upon the loosening rotation of the fastener to lock the fastener relative to the item being secured.

20 Claims, 13 Drawing Sheets

(56) References Cited

U.S. PATENT DOCUMENTS

| | | | |
|---|---|---|---|
| 1,263,241 A | 4/1918 | Heinke | |
| 1,275,359 A | 8/1918 | Bailey | |
| 1,829,293 A | 10/1931 | Olson | |
| 1,867,251 A * | 7/1932 | Cowlin | F16B 39/24 411/157 |
| 1,894,631 A | 1/1933 | Owen | |
| 1,916,526 A | 7/1933 | Olson | |
| 3,263,727 A * | 8/1966 | Herpolsheimer | |
| 5,433,567 A * | 7/1995 | Ito | |
| 5,681,136 A * | 10/1997 | Blair | F16B 39/108 411/120 |
| 5,772,373 A | 6/1998 | Cronin, II et al. | |
| 6,019,556 A * | 2/2000 | Hess | F16B 31/04 411/149 |
| 7,029,218 B2 * | 4/2006 | Peterkort | F16B 39/10 411/119 |
| 10,323,678 B2 * | 6/2019 | Hess | F16B 39/32 |
| 2003/0190212 A1 * | 10/2003 | Peterkort | F16B 39/10 411/119 |
| 2009/0060674 A1 * | 3/2009 | Kluga | B21D 53/20 470/42 |
| 2016/0160904 A1 * | 6/2016 | Lee | F16B 39/24 411/332 |
| 2018/0358859 A1 * | 12/2018 | Evans | H02K 3/50 |
| 2020/0309185 A1 * | 10/2020 | Hess | F16B 35/06 |
| 2022/0186768 A1 * | 6/2022 | Gong | F16B 31/02 |

FOREIGN PATENT DOCUMENTS

| | | | | |
|---|---|---|---|---|
| CN | 108361266 A | * | 8/2018 | F16B 39/16 |
| GB | 2463894 A | * | 3/2010 | F16B 39/24 |
| KR | 101625007 B1 | * | 5/2016 | |
| SU | 1681075 A1 | * | 9/1991 | |
| WO | WO-0188391 A1 | * | 11/2001 | F16B 39/028 |
| WO | 1443226 A | * | 4/2004 | |
| WO | WO-2010068001 A2 | * | 6/2010 | F16B 39/24 |

OTHER PUBLICATIONS

International Search Report for International Application No. PCT/US2021/013828 dated Apr. 6, 2021, 13 pages.

* cited by examiner

LOCKING THREADED FASTENER ASSEMBLY

BACKGROUND

Threaded fasteners, such as screws, bolts, and nuts, are commonly used to secure items to one another. One drawback, however, is that threaded fasteners can loosen over time, particularly if used in applications where the secured items and the threaded fasteners are subject to vibrations or other loads. There are many ways to inhibit a fastener from loosening over time, such as using nylon lock nuts, locking thread compounds, deforming threads, lock washers, and wire locks, to name a few. While each of these locking solutions are, for the most part, effective to a degree, they each have one or more drawbacks. Nylon lock nuts, thread compounds, and deforming threads can secure threaded fasteners, but in many cases, the threaded fasteners are not readily reusable once disassembled, if at all. Traditional lock washers can be used to inhibit a fastener from loosening, but despite these, the threaded fasteners can still loosen over time depending upon the loading experienced. Wire locks offer a secure locking mechanism and are repeatable, but can be time consuming to remove and install. In addition, a thread locking compound may not be applied properly, a nylon lock nut can wear out, and a wire lock can be installed incorrectly.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
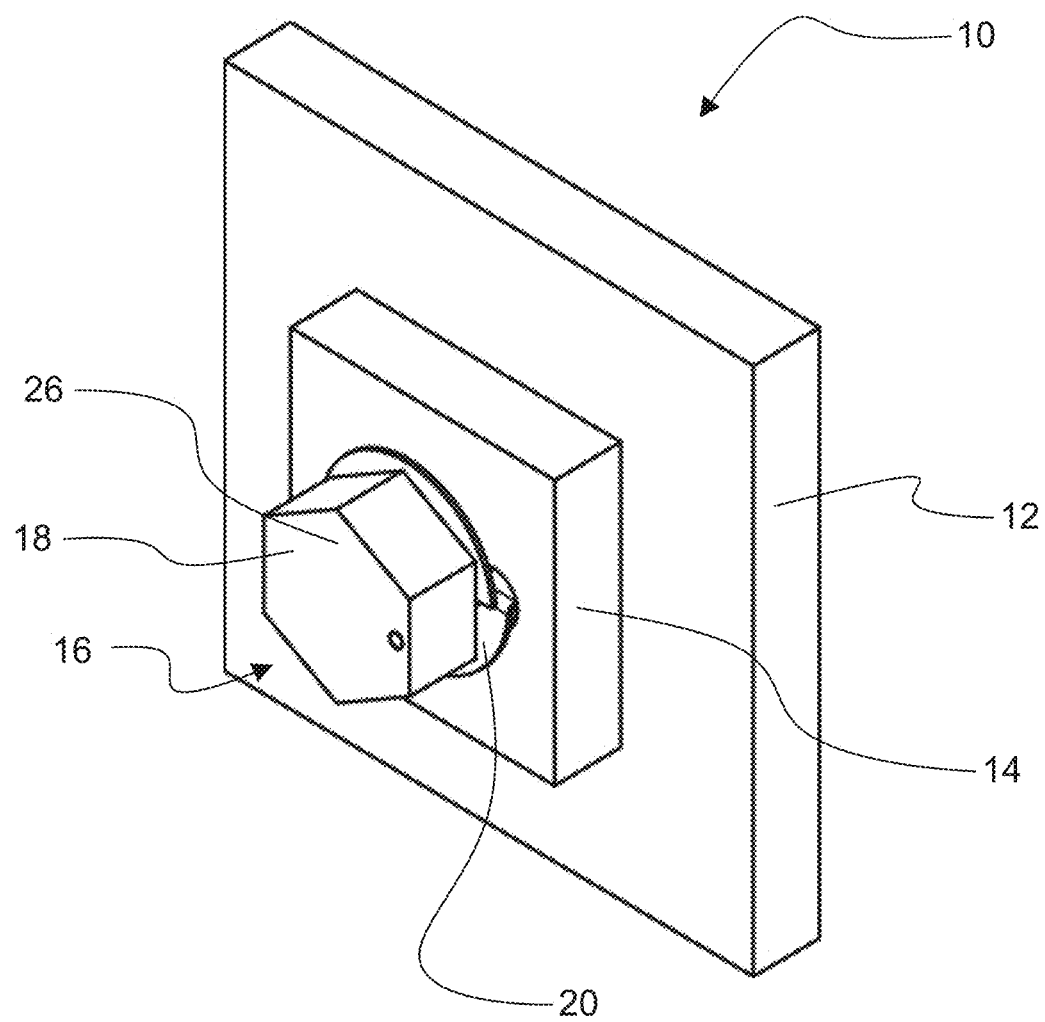
FIG. 1 illustrates an isometric view of a locking system having a locking fastener assembly coupling an item to base, in accordance with an example of the present disclosure.

Reference will now be made to the examples illustrated, and specific language will be used herein to describe the same. It will nevertheless be understood that no limitation of the scope of the invention is thereby intended.

DETAILED DESCRIPTION

When used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts is provided below, and then specific examples are described in further detail later. This initial summary is intended to aid readers in understanding the examples more quickly, but is not intended to identify key features or essential features of the examples, nor is it intended to limit the scope of the claimed subject matter.

In one example, disclosed is a locking fastener assembly. The locking fastener assembly comprises a fastener, a locking washer, and a locking member. The fastener comprises a threaded portion and a head having a first end and second end axially spaced from the first end. The second end comprises a fastening surface and a locking washer recess. The locking washer is disposed at least partially within the locking washer recess and comprises a locking tab extending in a first direction and a stop biased in a second direction opposing the first direction. The locking tab is operable to lock rotation of the locking washer relative to an item being secured upon a torqueing rotation and a loosening rotation of the fastener. The locking member is supported by the fastener and is operable to interface with the stop of the locking washer upon the loosening rotation of the fastener to lock the fastener relative to the item being secured.

In accordance with a more detailed aspect, the fastener can comprise a bolt and the threaded portion can comprise an externally threaded shaft of the bolt.

In accordance with a more detailed aspect, the fastener can comprise a nut and the threaded portion can comprise an internally threaded bore of the nut.

In accordance with a more detailed aspect, the second end can comprise an aperture in the locking washer recess and the locking member can comprise a pin secured in the aperture and extending away from the first end.

In accordance with a more detailed aspect, the locking member can comprise a protrusion formed in the locking washer recess with the protrusion extending away from the first end.

In accordance with a more detailed aspect, the locking washer can comprise a split spring washer and the stop can comprise a first end of the split spring washer and the tab can comprise a second end of the split spring washer.

In accordance with a more detailed aspect, the locking washer can comprise a plurality of support member defining a plurality of stops.

In accordance with a more detailed aspect, the fastening surface can be located radially inward of the locking washer recess and the locking washer can extend radially outward from the locking washer recess.

In accordance with a more detailed aspect, the fastening surface can be located radially outward of the locking washer recess, and the fastener can further comprise at least one access hole in communication with the locking washer recess and extending from the first end to the second end of the head.

Also disclosed is a locking system comprising a base, an item for securement to the base, and a locking fastener assembly. The base has a threaded interface operable to receive the locking fastener. The item for securement to the base comprises a locking washer stop. The locking fastener assembly comprises a fastener, a locking washer, and a locking member. The fastener comprises a threaded portion interfacing with the threaded interface of the base and a head having a first end and a second end axially spaced from the first end. The second end comprises a fastening surface and a locking washer recess. The locking washer is disposed at least partially within the locking washer recess and comprises a locking tab extending in a first direction into the locking washer stop and a stop biased in a second direction opposing the first direction. The locking tab is operable to lock rotation of the locking washer relative to the item being secured upon a torqueing rotation and a loosening rotation of the fastener. The locking member is supported by the fastener and is operable to interface with the stop of the locking washer upon the loosening rotation of the fastener to lock the fastener relative to the item being secured.

In accordance with a more detailed aspect, the locking washer stop can comprise an aperture in the item for securement.

In accordance with a more detailed aspect, the fastener can comprise at least one of a bolt or a nut.

In accordance with a more detailed aspect, the locking washer can comprise a split spring washer, the stop can comprise a first end of the split spring washer, and the tab can comprise a second end of the split spring washer.

In accordance with a more detailed aspect, the locking washer can comprise a plurality support members defining a plurality of stops.

In accordance with a more detailed aspect, the fastening surface can be located radially inward of the locking washer recess and the locking washer can extend radially outward from the locking washer recess.

In accordance with a more detailed aspect, the fastening surface can be located radially outward of the locking washer recess and the fastener can further comprise at least one access hole in communication with the locking washer recess and extending from the first end to the second end of the head.

Also disclosed is a method for configuring a locking fastener assembly. The method comprises configuring a fastener to have a threaded portion and a head having a first end and second end axially spaced from the first end, the second end comprising a fastening surface and a locking washer recess, configuring a locking washer to be disposed at least partially within the locking washer recess and to have a locking tab extending in a first direction and a stop biased in a second direction opposing the first direction, wherein the locking tab is operable to lock rotation of the locking washer relative to an item being secured upon a torqueing rotation and a loosening rotation of the fastener, and configuring a locking member to be supported by the fastener and operable to interface with the stop of the locking washer upon the loosening rotation of the fastener to lock the fastener relative to the item being secured.

In accordance with a more detailed aspect, the method can further comprise configuring an item to be fastened to have a locking washer stop operable to receive the locking tab.

In accordance with a more detailed aspect, the fastener can comprise a bolt and the threaded portion can comprise a threaded shaft of the bolt and the method can further comprise forming a threaded aperture in the base to receive the bolt.

In accordance with a more detailed aspect, the locking member can comprise a pin and the method can further comprise forming a hole in the locking washer recess sized and shaped to receive the pin and securing the pin in the hole.

Figure 2:
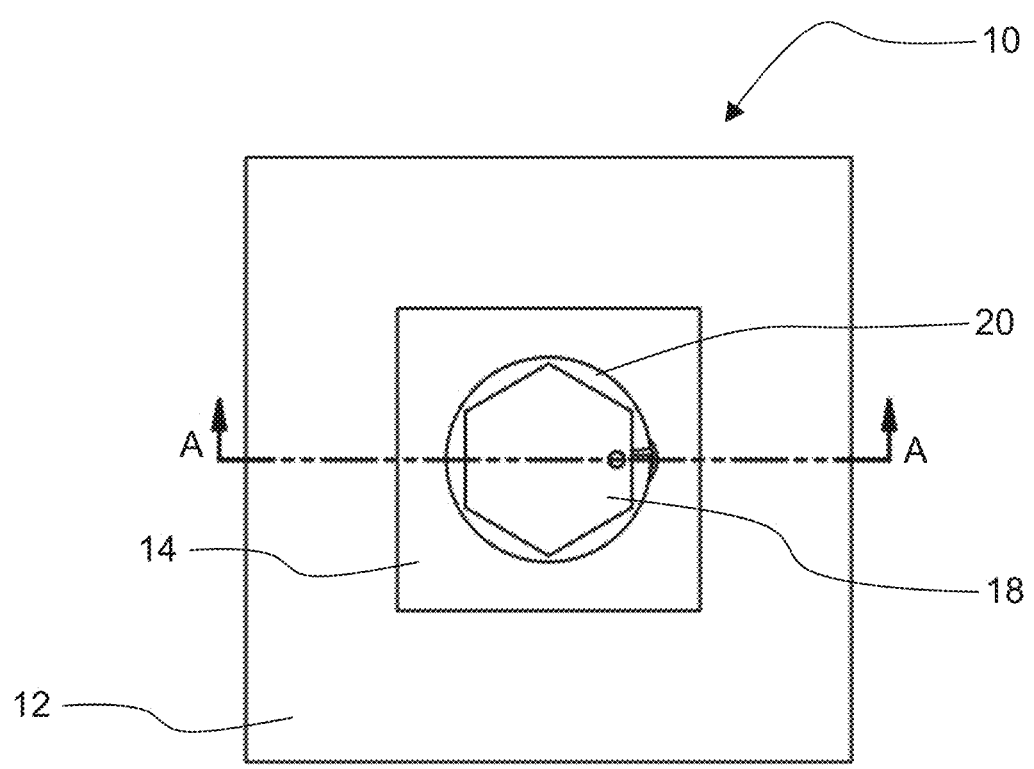
FIG. 2 illustrates a top view of the locking system and the locking fastener assembly of FIG. 1.
Figure 3:
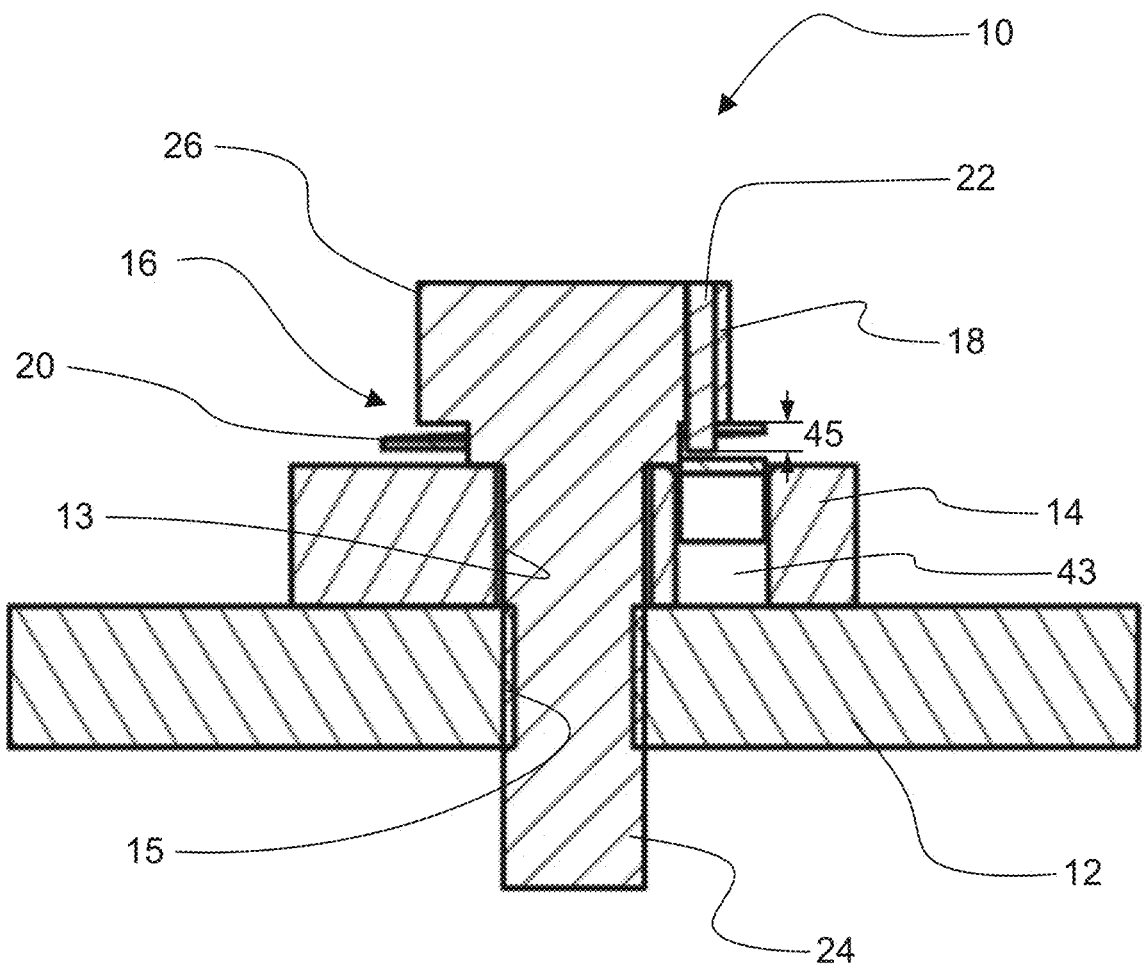
FIG. 3 illustrates a sectional view of the locking system and the locking fastener assembly of FIG. 1 taken about line AA of FIG. 2.

To further describe the present technology, examples are now provided with reference to the figures. FIGS. 1, 2, and 3 illustrate an example of a locking system 10 comprising a base 12, an object or item 14 to be coupled to the base 12, and a locking fastener assembly 16 coupling the item 14 to the base 12. It is noted that the base 12 and item 14 are representative of any two or more components that can be joined together by the locking fastener assembly 16.

The locking fastener assembly 16 can comprise a fastener, such as a bolt 18, a helical spring-like member, such as a locking washer 20, and a locking member 22. The bolt 18 can have a shaft 24 that is at least partially threaded and that passes through an aperture 13 of the item 14 and that is threaded into a threaded socket 15 of the base 12. Rotation of the bolt 18 in a first direction (typically clockwise) causes a head 26 of the bolt 18 to advance towards the base 12, reducing a distance between the base 12 and the head 26, clamping the item 14 between the head 26 the base 12. Rotation of the bolt 18 in a second direction opposite the first direction (typically counterclockwise) results in the head 26 moving away from the base 22, unclamping the item 14 from the base 12. In some examples, the directions can be reversed, with a counterclockwise rotation clamping the item 14 between the head 26 and the base 12 and a clockwise rotation unclamping the item 14, such as in the example of reverse threading on the bolt 18.

Figure 4:
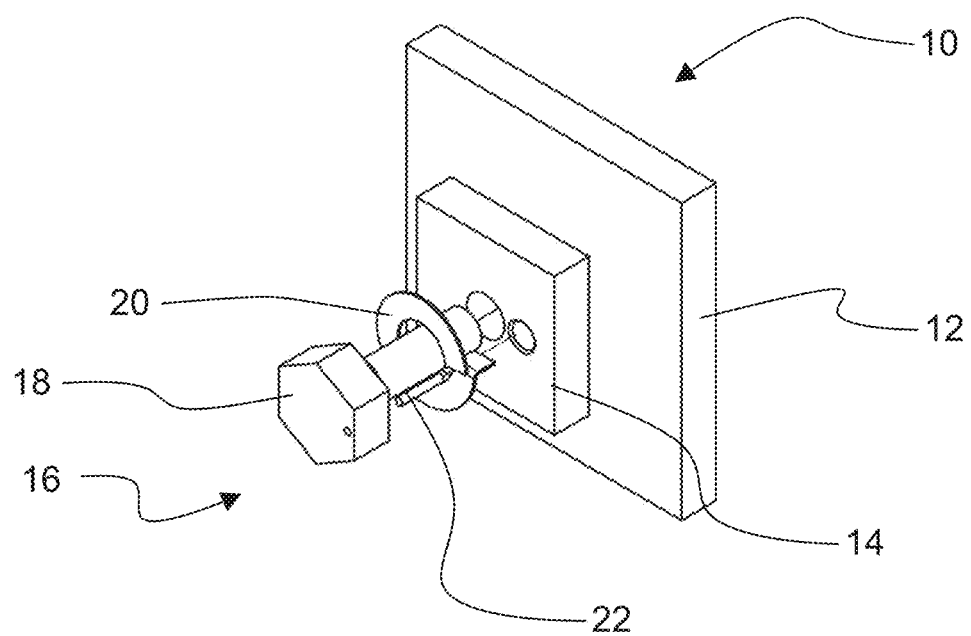
FIG. 4 illustrates an exploded isometric view of the locking system and the locking fastener assembly of FIG. 1.
Figure 5:
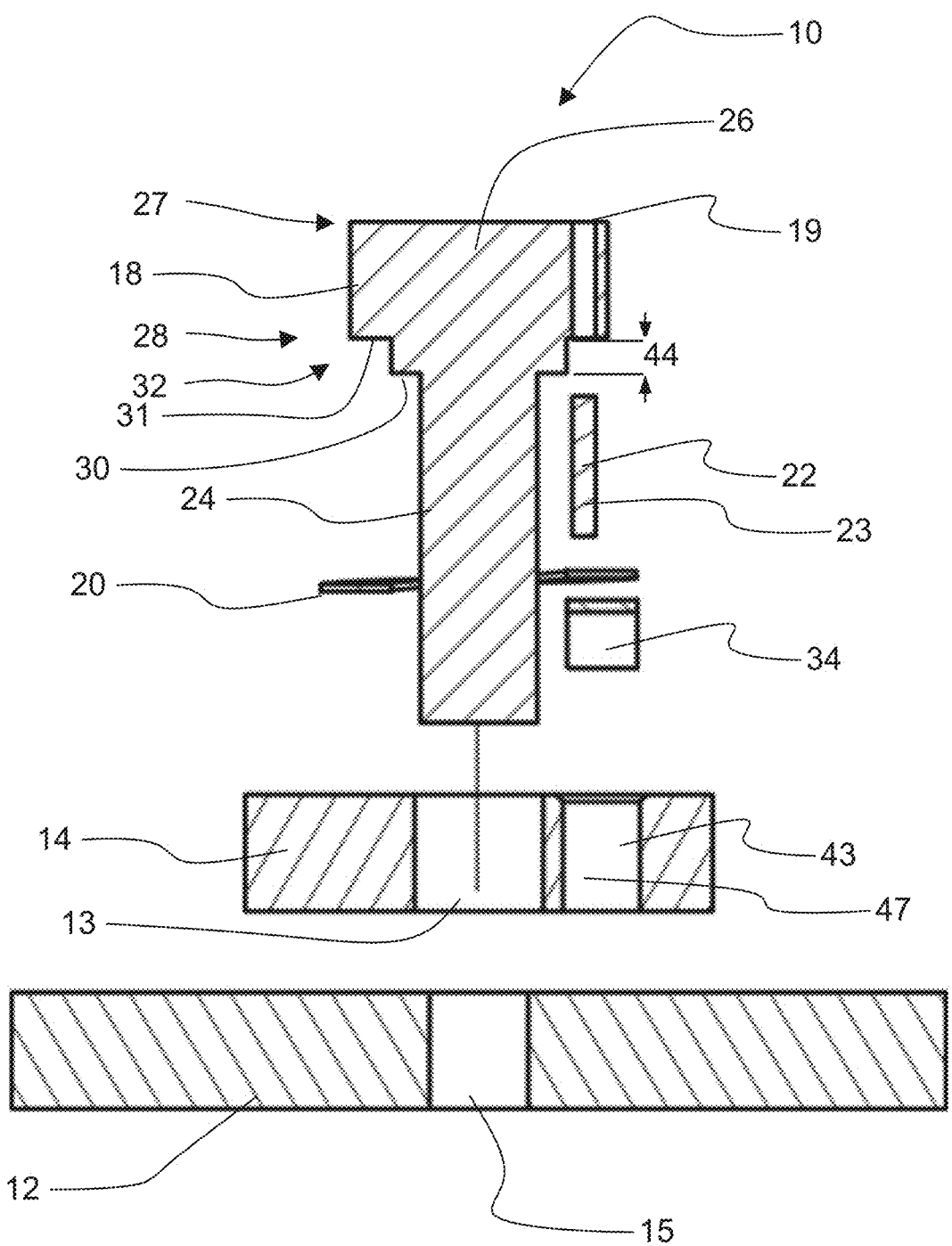
FIG. 5 illustrates an exploded section view of the locking system and the locking fastener assembly of FIG. 1 taken about line AA of FIG. 2.

FIG. 4 illustrates an exploded view of the locking system 10 of FIG. 1 showing the base 12, the item 14 to be coupled to the base 12, and the locking fastener assembly 16 including the bolt 18, locking washer 20, and the locking member 22. FIG. 5 is an exploded cross-section view of the locking system 10 of FIG. 1 showing each of the components. With reference to FIGS. 1-5, the bolt 18 comprises the shaft 24 that has a threaded portion and the head 26. The head 26 has a first end 27 and a second end 28 axially spaced apart from the first end 27. The second end 28 comprises a fastening surface 30 that engages and seats against the item 14 being secured to the base 12. The second end 28 further comprises a locking washer recess 32 that is sized and shaped to receive at least a portion of the locking washer 20. The fastening surface 30 is located radially inward of the locking washer recess 32 and the locking washer 20 can extend radially outward from the locking washer recess 32. When the bolt 18 is tightened, the fastening surface 30 presses against the item 14 to secure it to the base 12. The locking washer recess 32 provides a space between the item 14 and the head 26 when the bolt is tightened (see FIG. 3), When assembled, as shown in FIGS. 1-3, the locking washer 20 is disposed at least partially in the locking washer recess 32 about the shaft 24 of the bolt 18.

The locking member 22 is supported by the bolt 18 and can be configured to extend away from the second end 28 and into the locking washer recess 32. The locking member 22 can comprise a protrusion formed in the locking washer recess 32, or in some examples, the locking member 22 can comprise a pin 23. The bolt 18 can have an aperture 19 sized and shaped to receive the pin 23, the aperture 19 being in communication with the locking washer recess. The pin 23 can be press fit or otherwise secured within the aperture 19 so that a first portion of the pin 23 is supported within the aperture 19 and a second portion of the pin 23 extends into the locking washer recess 32 as shown in FIG. 3. In some examples, the aperture 19 can extend completely through the head of the bolt 18 so that the first portion of the pin 23 is accessible through the aperture 19, or in other examples, the aperture 19 can be a blind hole that does not extend completely through the head 26.

Figure 6:
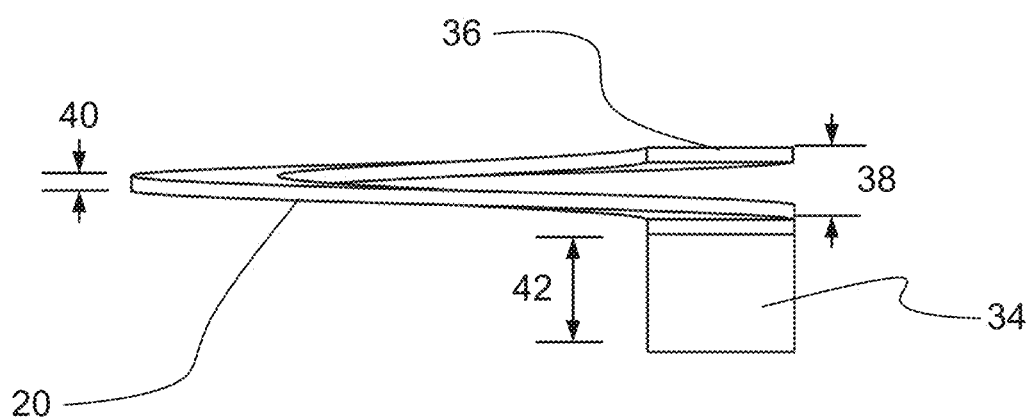
FIG. 6 illustrates a side view of a locking washer of the locking fastener assembly of the locking system of FIG. 1.

FIG. 6 illustrates a side view of the locking washer 20 of FIGS. 1-5. The locking washer 20 comprises a locking tab 34 that extends in a first direction (downward in the orientation shown in FIG. 6) and a stop 36 biased in a second direction opposite the first direction (upward in the orientation shown in FIG. 6). For example, the locking washer 20 can comprise a split spring washer biased to have a height 38 (as measured as shown in FIG. 6 between an upper surface of the locking washer 20 at a first end and a lower surface of the locking washer 20 at a point just prior to the locking tab 34) that is greater than a thickness 40 of the locking washer 20. A first end of the split spring washer can have a face forming the stop 36 and a second end of the split spring washer can be bent to form the locking tab 34. The locking tab 34 has a length 42 extending in the second direction. Thus, the locking washer 20 can have an unconstrained shape shown in FIG. 6, but that is compressible by an external, axial force to cause a reduction in the height 38 of the locking washer 20. In the unconstrained shape, the locking washer forms an inclined helical surface between the locking tab 34 and the stop 36.

With reference to FIGS. 1-6, the locking washer recess 32 can have a height or depth 44 that is less than the height 38 of the locking washer 20. The locking member 22 can extend into the recess a length 45 that is at least as great as the thickness 40 of the locking washer 20, but less than the height 38 of the locking washer 20 minus the thickness 40 of the locking washer 20. Thus, when assembled, as shown in FIG. 3, the locking washer 20 is at least partially disposed in the locking washer recess 32 and can be partially compressed between the item 14 being secured and the head 26.

The item 14 being secured can comprise a locking washer stop 43 configured to keep the locking washer 20 from rotating relative to the item 14. In some examples, the locking washer stop 43 can comprise an aperture 47 formed in the item 14 that has depth that is at least as great at the length of the locking tab 34. The aperture 47 can be sized to receive the locking tab 34 when the locking system 10 is assembled. When assembled, the interference between the locking tab 34 and the surface(s) of the aperture 47 prevents the locking tab 34 from lateral movement including rotation. Thus, when assembled, the rotation of the locking washer 20 is locked relative to the item 14 being secured in both a torqueing and a loosening rotation of the fastener 16. During a torqueing operation, the head 26 of the bolt 18 urges the locking washer 20 towards the item 14 being fastened, urging the locking tab 34 into the aperture 47 of the item 14.

The locking member 34 can extend into the locking washer recess 32 a distance at least as far as the thickness 40 of the locking washer 20. Because the locking washer 20 is biased to have a height 38 greater than the depth 44 of the locking washer recess 32 and the stop 36 is at an end of the locking washer 20, the stop 36 is biased to be proximate a base 31 of the locking washer recess 32. As the bolt 18 is tightened, the locking member 22 travels along the inclined surface of the locking washer 20, overcoming the bias of the locking washer 20 and compressing the locking washer 20 (i.e., decreasing the height 38) as the locking member 22 approaches the stop 36. Once the locking member 22 passes the stop 36, the bias of the locking washer 20 returns the stop 36 to be proximate the recess base 31. Thus, the bolt 18 can be continuously rotated and tightened without interference, namely without interference from the stop 36 of the locking washer 20 until the desired torque is reached.

The bolt 18 can be loosened by turning it in an opposite direction. However, the locking member 22 travels along the locking washer 20 in an opposite direction and does not further compress the locking washer 20 as it travels down the inclined surface of the locking washer 20. Instead, the height 38 of locking washer 20 increases as the bolt 18 is loosened. Eventually, the locking member 22 reaches the stop 36, which is now adjacent the base 31 of the locking washer recess 32. In this position, the bolt 18 comes into contact with the stop 36, thus interfering with and preventing further rotation of the bolt 18 in that rotational direction. Indeed, as the locking member 22 engages the stop 36 of the locking washer 20, the bolt 18 is prevented from further rotation in the loosening direction due to the locking member 34 contacting the stop 36. The bolt 18 is therefore effectively locked and unable to be loosened. The bolt 18 can still be turned in the tightening direction, as such movement moves the locking member 22 away from the stop and along the inclined surface of the locking washer 20.

During normal operation, with the locking system 10 assembled as shown in FIGS. 1-3, the bolt 18 is locked. However, an operator can unlock the bolt 18 by overcoming the bias of the locking washer 20 to move the stop 36 away from the base 31 of the recess 32 a sufficient distance, such that the stop 36 no longer interferes with the locking member 22. For example, a user can apply a force to a portion of the locking washer 20 extending radially outward from the locking washer recess 32. In some examples, a user can apply such a force to the locking washer 20 using a standard socket fitted over the head 26 of the bolt 18, where the socket is configured to be inserted over the bolt head 26 and to compress the locking washer 20 by causing the bolt head 26 to be further inserted into the socket. The bolt 18 can then be loosened using the standard socket since the locking member 22 no longer contacts the stop 36 during a loosening rotation.

Thus, as shown in FIGS. 1-6, the described locking system and locking fastener assembly are able to fasten parts together in a secure fashion that is resistant to loosening over time. Moreover, the locking system can be easily unlocked by a user using common fastening tools such as a socket. The system can be reused without having to replace or clean any parts as would be required by prior attempts and methods to lock threaded fasteners into place.

FIGS. 7-12 illustrate an example of a locking system 100 having a security feature. The locking system 100 is similar in many respects to the locking system 110 of FIGS. 1-7 discussed above, as will be apparent to those skilled in the art. As such, the above discussion is incorporated here, where applicable, to provide and understanding and discussion of like features and functions. In this example, the locking system 100 comprises a base 112, an item 114 to be coupled to the base 112, and a locking fastener assembly 116 coupling the item 114 to the base 112. The locking fastener assembly 116 can comprise a fastener, such as a bolt 118, a locking washer 120, and a locking member 122. The bolt 118 can have a shaft 124 having threads formed at least partially thereon, that passes through an aperture 113 of the item 114 and is threaded into a threaded socket 115 of the base 112. Rotation of the bolt 118 in a first direction (typically clockwise) causes a head 126 of the bolt 118 to advance towards the base 112, reducing a distance between the base 112 and the head 126, clamping the item 114 between the head 126 and the base 112. Rotation of the bolt 118 in a second direction opposite the first direction (typically counterclockwise) results in the head 126 moving away from the base 122, unclamping the item 114 from the base 112. In some examples, the directions can be reversed; with a counterclockwise rotation clamping the item 114 between the head 126 and the base 112 and a clockwise rotation unclamping the item 114.

Figure 7:
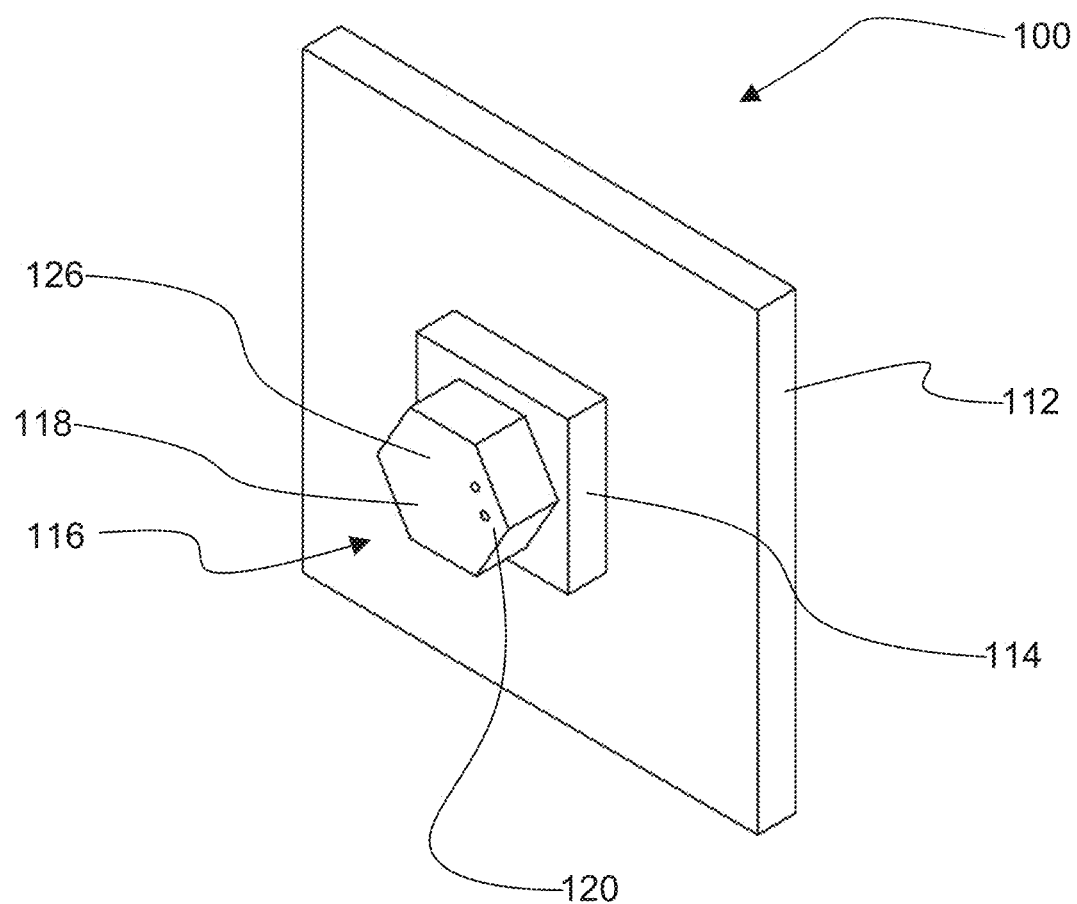
FIG. 7 illustrates an isometric view of a locking system having a locking fastener assembly having a hidden locking washer, in accordance with an example of the present disclosure.
Figure 8:
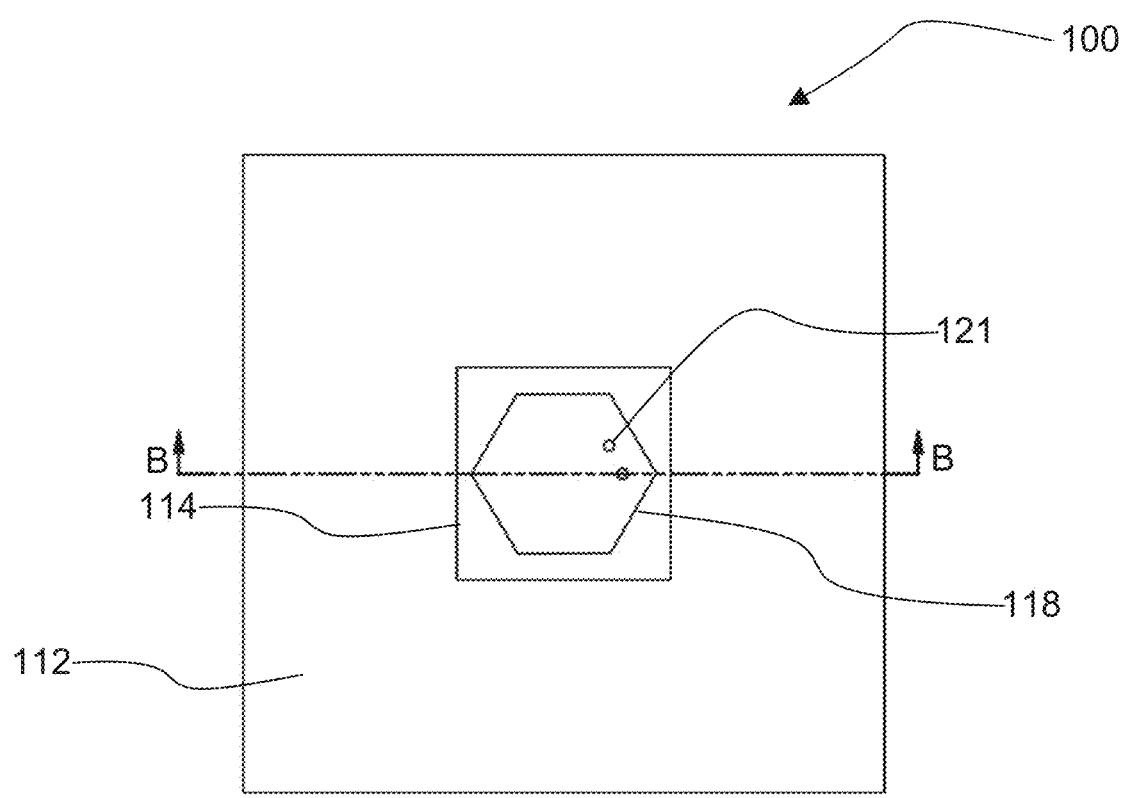
FIG. 8 illustrates a top view of the locking system and the locking fastener assembly of FIG. 7.
Figure 9:
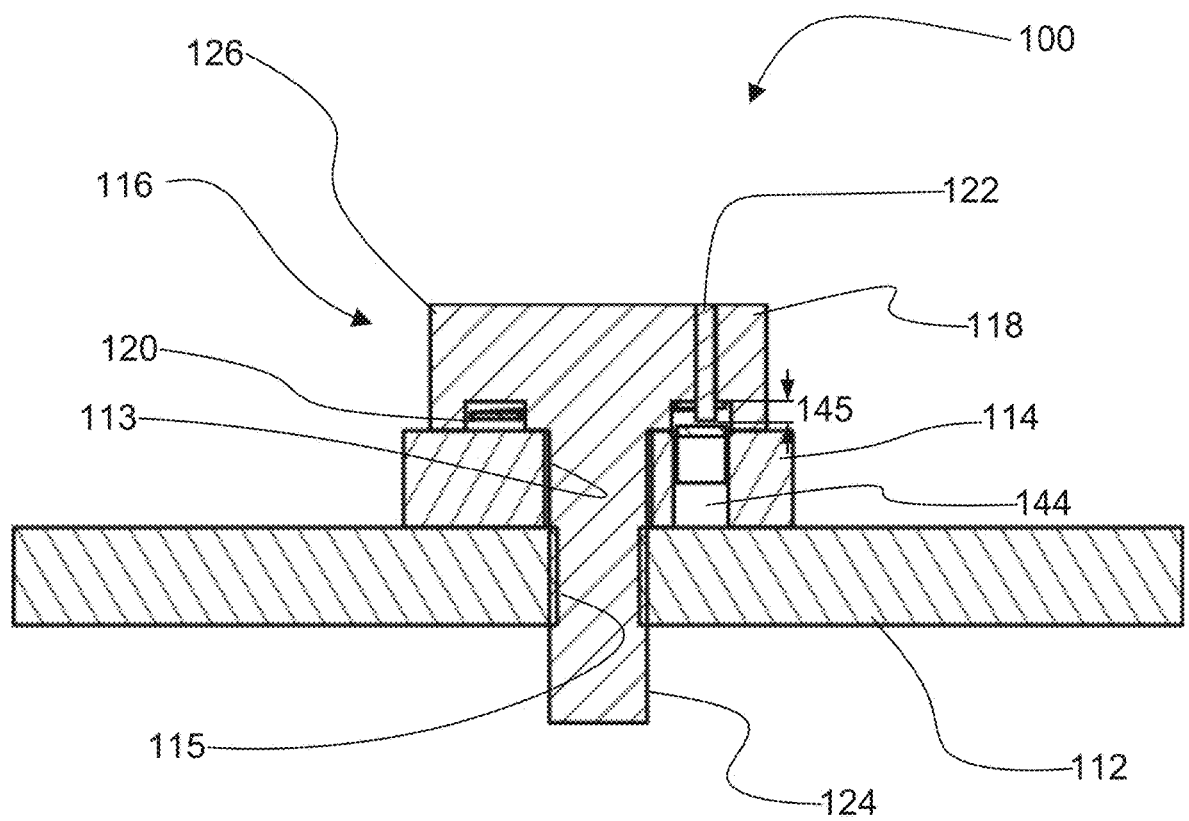
FIG. 9 illustrates a sectional view of the locking system and the locking fastener assembly of FIG. 7 taken about line BB of FIG. 8.
Figure 10:
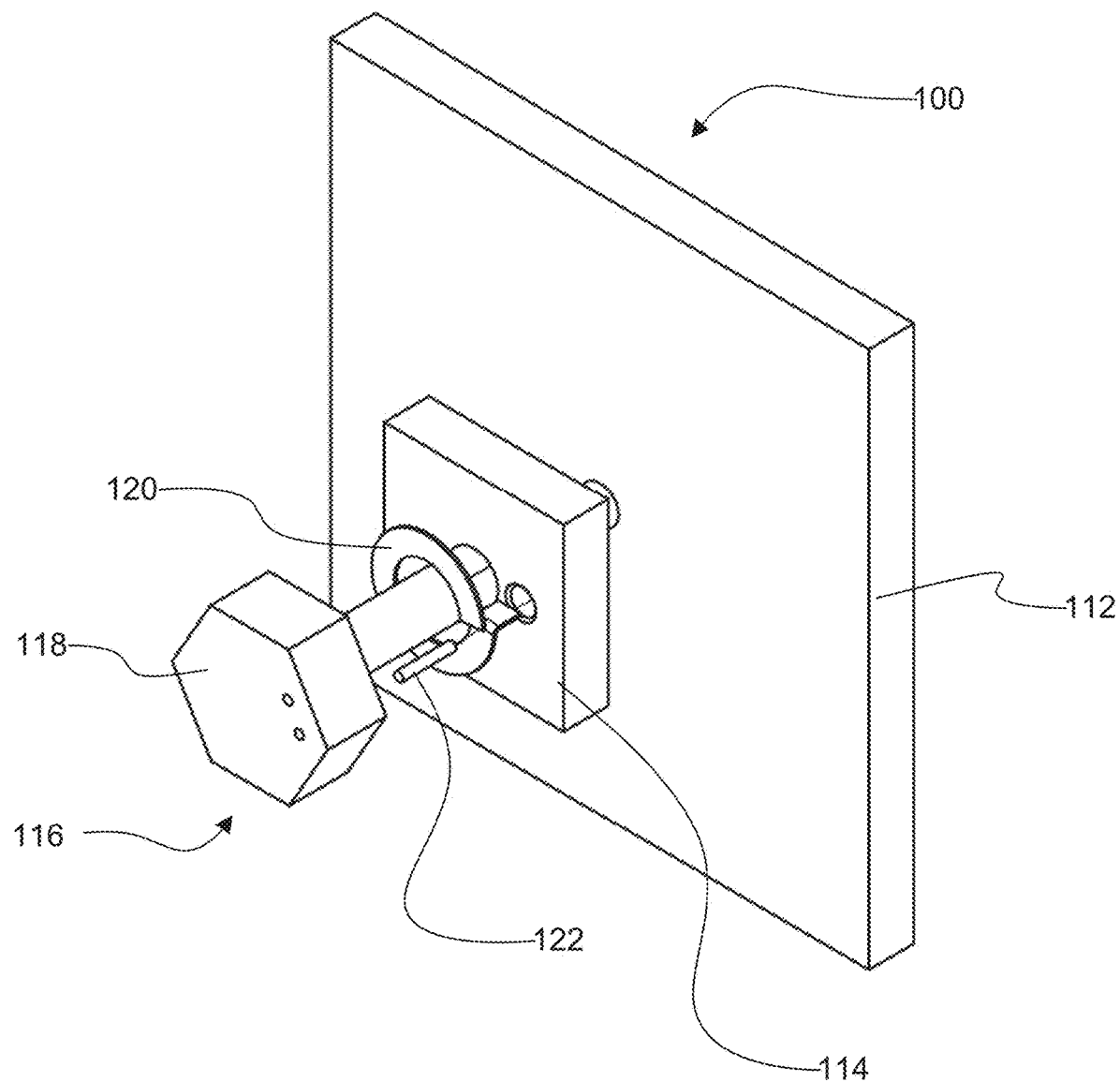
FIG. 10 illustrates an exploded isometric view of the locking system and the locking fastener assembly of FIG. 7.
Figure 11:
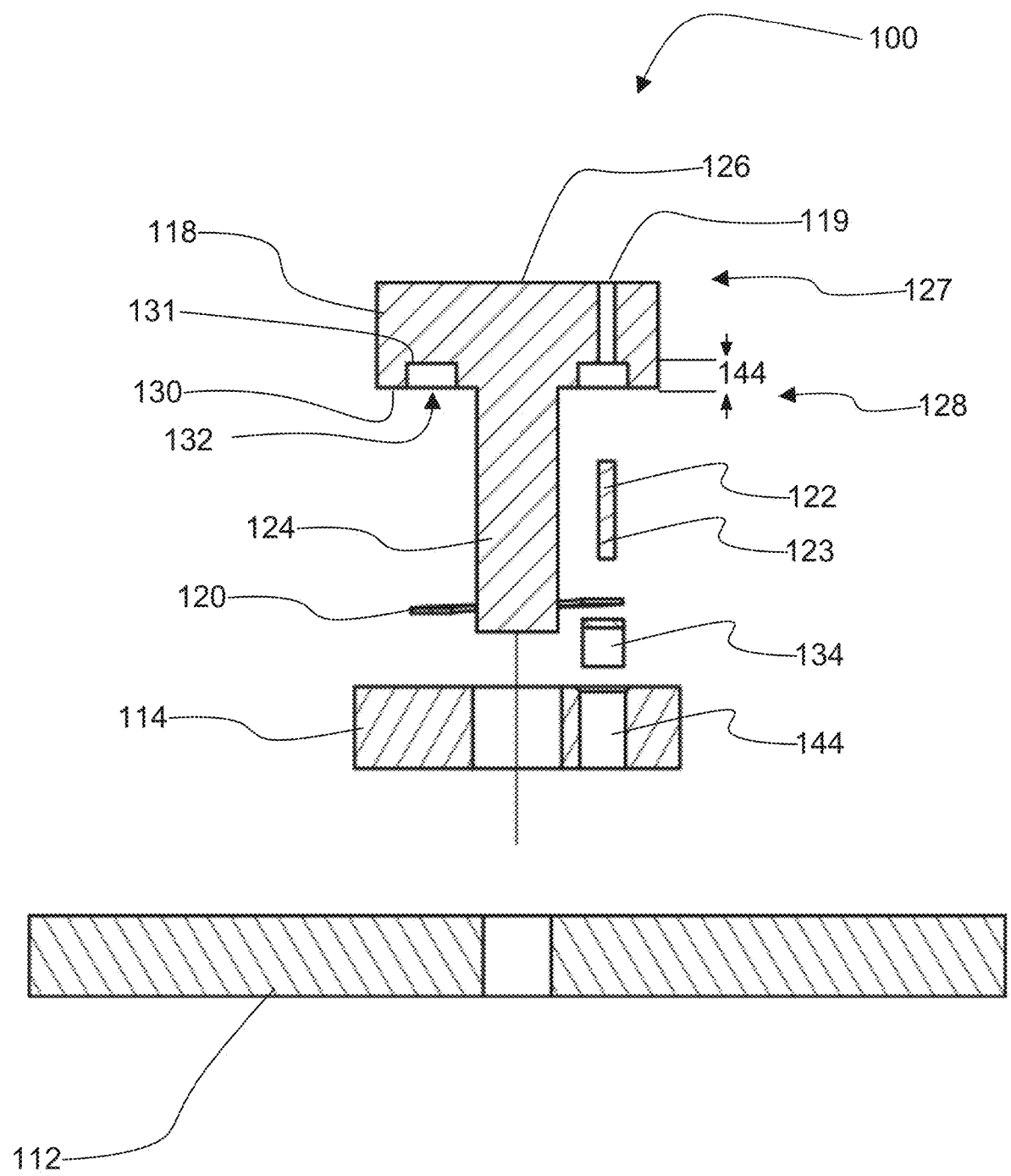
FIG. 11 illustrates an exploded section view of the locking system and the locking fastener assembly of FIG. 7 taken about line BB of FIG. 8.

FIG. 10 illustrates an exploded view of the locking system 100 of FIG. 7 showing the base 112, the item 114 to be coupled to the base 112, and the locking fastener assembly 116 including the bolt 118, locking washer 120, and the locking member 122. FIG. 11 is an exploded cross-section view of the locking system 110 of FIG. 7 showing each of the components. With reference to FIGS. 7-11, the bolt 118 comprises the shaft 124 that has a threaded portion and the head 126. The head 126 has a first end 127 and a second end 128 axially spaced apart from the first end 127. The second end 128 comprises a fastening surface 130 that engages and seats against the item 114 being secured to the base 112. The second end 28 further comprises a locking washer recess 32 that is sized and shaped to receive the locking washer 120. In contrast to the example in FIGS. 1-6, in the example of FIGS. 7-11, the fastening surface 130 is radially outward relative to the locking washer recess 132. When the bolt 118 is tightened, the fastening surface 130 presses against the item 114 to secure it to the base 112. The locking washer recess 132 provides a space between the item 114 and the head 126 when the bolt 118 is tightened. When assembled, as shown in FIGS. 7-9, the locking washer 120 is disposed at least partially within the locking washer recess 132 about the shaft 124 of the bolt 118. Because the fastening surface 130 is radially outward relative to the locking washer recess 132, access to the locking washer 120 is inhibited or prevented, thus providing a security feature for the locking system 100.

The locking member 122 is supported by the bolt 118 and can be configured to extend away from the second end 128 and into the locking washer recess 132. In some examples, the locking member 122 can comprise a pin 123. The bolt 118 can have a first aperture 119 sized and shaped to receive the pin 123. The pin 123 can be press fit or otherwise secured within the aperture 119 so that a first portion of the pin 123 is supported within the aperture 119 and a second portion of the pin 123 extends into the locking washer recess 132 as shown in FIG. 9. In some examples, the first aperture 119 can extend completely through the head 126 of the bolt 118, or in other examples, the first aperture 119 can be a blind hole that does not extend completely through the head 126. In addition to the first aperture 119, a second aperture 121 can be formed in the head 126, and can be configured to extend through the head 126 to provide access to the locking washer recess 132 adjacent the first aperture 119. As will be described later, the second aperture 121 can provide access to the locking washer recess 132 to enable an operator to unlock the locking fastener assembly 116.

The locking washer 120 can have the same configuration as the locking washer of FIG. 6 with the exception that the locking washer 120 can be configured to have a diameter that does not extend radially beyond the head 126 of the bolt 118, but that fits within the locking washer recess 132. The locking washer recess 132 can have a height or depth 144 that is less than the height of the locking washer 120. The locking member 122 can extend into the recess 132 a length 145 that is at least as great as the thickness of the locking washer 120, but less than the height of the locking washer 120 minus the thickness of the locking washer 120. Thus, when assembled, as shown in FIGS. 7 and 9, the locking washer 120 is at least partially disposed in the locking washer recess 132 and can be partially compressed between the item 114 being secured and the head 126.

The item 114 being secured can comprise an aperture 144 formed therein that has depth that is at least as great at the length of the locking tab 134. The aperture 144 can be sized to receive the locking tab 134 when the locking system 110 is assembled. When assembled, the interference between the locking tab 134 and the surface(s) of the aperture 144 prevents the locking tab 134 from lateral movement including rotation. Thus, when assembled, the rotation of the locking washer 120 is locked relative to the item 114 being secured in both a torqueing and a loosening rotation of the fastener 116. During a torqueing operation, the head 126 of the bolt 118 urges the locking washer 120 towards the item 114 being fastened, urging the locking tab 134 into the aperture 144 of the item 114.

The locking member 134 can extend into the locking washer recess 132 a distance at least as far as the thickness of the locking washer 120. Because the locking washer 120 is biased to have a height greater than the depth of the locking washer recess 132 and the stop 136 is at an end of the locking washer 120, the stop 136 is biased to be proximate a base 131 of the locking washer recess 132. As the bolt 118 is tightened, the locking member 122 travels along the inclined surface of the locking washer 120, overcoming the bias of the locking washer 120 and compressing the locking washer 120 as the locking member 122 approaches the stop 136. Once the locking member 122 passes the stop 136, the bias of the locking washer 120 returns the stop 136 to be proximate the recess base 131. Thus, the bolt 118 can be continuously rotated and tightened without interference from the stop 136 of the locking washer 120 until the desired torque is reached.

The bolt 118 can be loosened by turning it in an opposite direction. However, the locking member 122 travels along the locking washer 120 in an opposite direction and does not further compress the locking washer 120 as it travels down the inclined surface of the locking washer 120. Instead, the height of locking washer 120 increases as the bolt 118 is loosened. Eventually, the locking member 122 reaches the stop 136, which is now adjacent the base 131 of the locking washer recess 132. In this position, the bolt 118 comes into contact with the stop 136, thus interfering with and preventing further rotation of the bolt 118 in that rotational direction. Indeed, as the locking member 122 engages the stop 136 of the locking washer 120, the bolt 118 is prevented from further rotation in the loosening direction due to the locking member 134 contacting the stop 136. The bolt 118 is therefore effectively locked and unable to be loosened. The bolt 118 can still be turned in the tightening direction, as such movement moves the locking member 122 away from the stop and along the inclined surface of the locking washer 120.

During normal operation, with the locking system 10 assembled as shown in FIGS. 7-9, the bolt 118 is locked. However, an operator can unlock the bolt 118 by overcoming the bias of the locking washer 120 to move the stop 136 away from the base 131 of the recess 132 a sufficient distance, such that the stop 136 no longer interferes with the locking member 122. For example, a user can insert a pin into the second aperture 121 of the head 126 to apply a force to the locking washer 120, such as the stop 136. Or a tool can have an integrated pin that extends into the second aperture 121 to apply such a force to the stop 136. The bolt 118 can then be loosened since the locking member 122 no longer contacts the stop 136 during a loosening rotation.

Thus, as shown in FIGS. 7-11, the described locking system 100 and locking fastener assembly 16 are able to fasten parts together in a secure fashion that is resistant to loosening over time. Moreover, the locking system 100 can be easily unlocked by a user by pressing the stop 136 through the second aperture 121. Thus, the locking system 100 provides not only a locking fastener, but a tamper resistant fastener since it may be difficult to press the stop without the proper tool.

Figure 12:
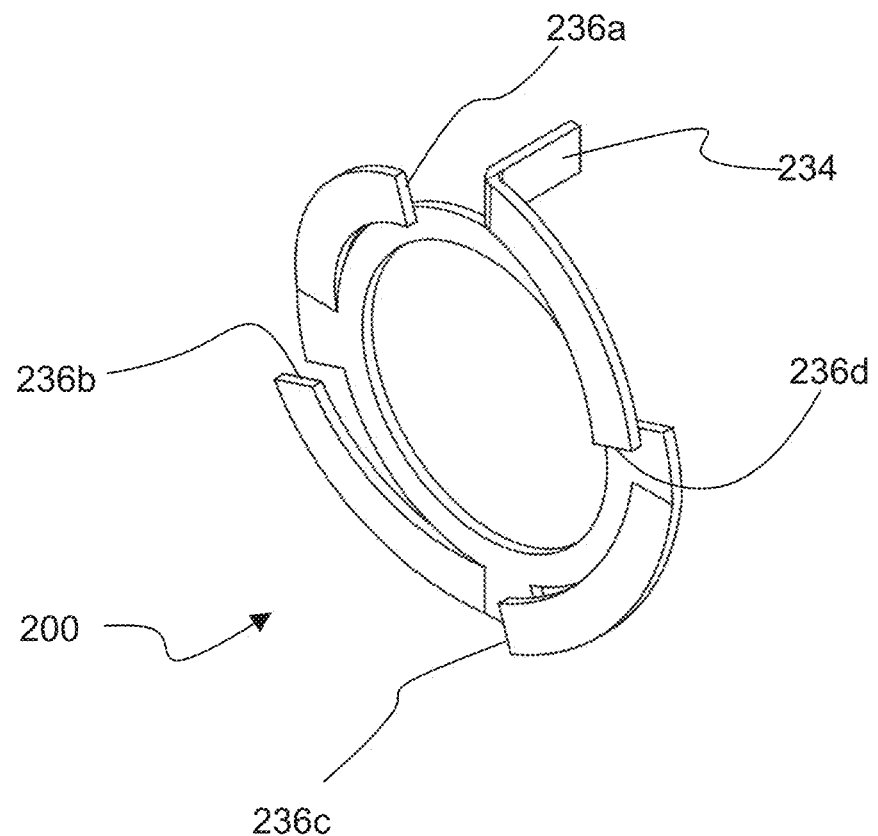
FIG. 12 illustrates an isometric view of another example of a locking washer that can be used in either of the locking fastener assemblies of FIGS. 1 and 7.

FIG. 12 illustrates another example of a locking washer 200 that can be used with either of the locking systems 10 and 110, discussed above, as will be apparent to those skilled in the art. The locking washer 200 is similar in many respects to locking washers 20, 120 of FIGS. 1-11 discussed above, as will be apparent to those skilled in the art. As such, the above discussion is incorporated here, where applicable, to provide and understanding and discussion of like features and functions. Locking washer 200 may be used in place of locking washer 20 and 120. Unlike the locking washers 20 and 120 discussed above, the locking washer 200 comprises a locking tab 234 that extends in a first direction and a plurality of support members defining stops 236a, 236b, 236c, 236d that are biased in a second direction opposite the first direction.

The locking washer 200 functions similarly to locking washers 20, 120, but the four stops 236a, 236b, 236c, 236d provide additional discrete stops and tighter locking tolerances relative to the single stops 36, 136 of locking washers 20, 120, respectively. Specifically, the four stops 236a-d provide a plurality of locking positions. Because the locking fastener assemblies only lock when the locking member contacts the stop, those examples with a single stop result in the locking fastener assembly being able to rotate up to nearly a full turn before being locked from further movement. However, those examples having a plurality of stops and associated locking positions result in the locking fastener assembly being unable to rotate as far before encountering a stop, thus providing tighter locking tolerances. Those skilled in the art will recognize that the locking washer can be configured to comprise any number of support members and associated stops.

Figure 13:
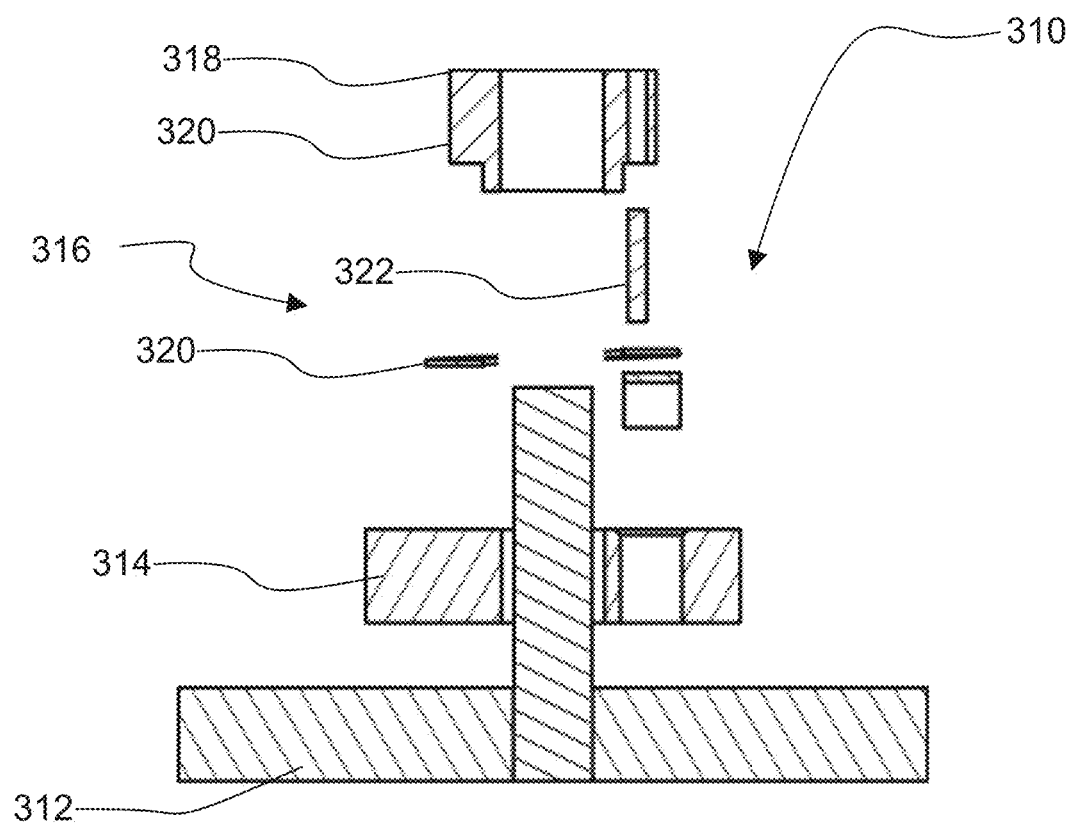
FIG. 13 illustrates an isometric view of a locking system and a locking fastener assembly coupling an item to base, in accordance with an example of the present invention.

FIG. 13 illustrates an exploded cross-section view of another example of a locking system 300. The locking system 310 is similar in many respects to locking systems 10 and 110, discussed above, as will be apparent to those skilled in the art. As such, the above discussion is incorporated here, where applicable, to provide and understanding and discussion of like features and functions. Locking system 310 comprises a base 312, an item 314 to be fastened, and a fastening assembly 316 coupling the item 314 to the base 312. The locking fastener assembly 316 can comprise a fastener, which in this example is in the form of a nut 318, a locking washer 320, and a locking member 322. Each component functions as described previously, with the exception that the threaded portion of the fastener comprises an internally threaded bore of the nut 318 rather than a shaft of a bolt, wherein the nut 318 is configured to threadably interface with a threaded shaft of a bolt to secure the item 314 to the base 312. In this example, the nut 318 is configured with a locking washer recess similar to the locking washer recess 32 of the locking fastener assembly 16 of the locking system 10. However, those skilled in the art will recognize that the nut 318 can be configured to comprise a locking washer recess similar to that of the locking fastener assembly 116 of the locking system 110.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details; or with other methods, components, materials; etc. In other instances, well-known structures, materials, or operations are not shown or described in detail to avoid obscuring aspects of the invention.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A locking fastener assembly comprising:
   a fastener comprising a threaded portion and a head having a first end and second end axially spaced from the first end, the second end comprising a fastening surface and a locking washer recess;
   a locking washer disposed at least partially within the locking washer recess, the locking washer comprising a locking tab extending in a first direction away from the head of the fastener and a stop biased to move in a second direction away from the locking tab and opposing the first direction, wherein the locking tab is operable to lock rotation of the locking washer relative to an item being secured upon a torqueing rotation and a loosening rotation of the fastener, and wherein the locking washer comprises a planar upper surface adjacent the stop; and a locking member supported by the fastener, and operable to interface with the stop of the locking washer upon the loosening rotation of the fastener to lock the fastener relative to the item being secured.

2. The locking fastener assembly of claim 1, wherein the fastener comprises a bolt, and wherein the threaded portion comprises an externally threaded shaft of the bolt.

3. The locking fastener assembly of claim 1, wherein the fastener comprises a nut, and wherein the threaded portion comprises an internally threaded bore of the nut.

4. The locking fastener assembly of claim 1, wherein the second end comprises an aperture in the locking washer recess and the locking member comprises a pin secured in the aperture and extending away from the first end.

5. The locking fastener assembly of claim 1, wherein the locking member comprises a protrusion formed in the locking washer recess, the protrusion extending away from the first end.

6. The locking fastener assembly of claim 1, wherein the locking washer comprises a split spring washer and the stop comprises a first end of the split spring washer and the locking tab comprises a second end of the split spring washer.

7. The locking fastener assembly of claim 1, wherein the locking washer comprises a plurality of support members defining a plurality of stops.

8. The locking fastener assembly of claim 1, wherein the fastening surface is located radially inward of the locking washer recess and the locking washer extends radially outward from the locking washer recess.

9. The locking fastener assembly of claim 1, wherein the fastening surface is located radially outward of the locking washer recess, wherein the fastener further comprises at least one access hole extending from the first end to the second end of the head, the access hole being in communication with the locking washer recess.

10. A locking system, comprising:
   a base having a threaded interface operable to receive a locking fastener;
   an item for securement to the base, the item for securement to the base comprising a locking washer stop; and
   a locking fastener assembly comprising:
      a fastener comprising a threaded portion interfacing with the threaded interface of the base, and a head having a first end and second end axially spaced from the first end, the second end comprising a fastening surface and a locking washer recess;
      a locking washer disposed at least partially within the locking washer recess, the locking washer comprising a locking tab extending in a first direction away from the head of the fastener and into the locking washer stop and a stop biased to move in a second direction away from the locking tab and opposing the first direction, wherein the locking tab is operable to lock rotation of the locking washer relative to the item being secured upon a torqueing rotation and a loosening rotation of the fastener, and wherein the locking washer comprises a planar upper surface adjacent the stop; and
      a locking member supported by the fastener, and operable to travel along the planar surface and interface with the stop of the locking washer upon the loosening rotation of the fastener to lock the fastener relative to the item being secured.

11. The locking system of claim 10, wherein the locking washer stop comprises an aperture in the item for securement.

12. The locking system of claim 10, wherein the fastener comprises at least one of a bolt or a nut.

13. The locking system of claim 10, wherein the locking washer comprises a split spring washer, the stop comprises a first end of the split spring washer, and the locking tab comprises a second end of the split spring washer.

14. The locking system of claim 10, wherein the locking washer comprises a plurality of support members defining a plurality of stops.

15. The locking system of claim 10, wherein the fastening surface is located radially inward of the locking washer recess and the locking washer extends radially outward from the locking washer recess.

16. The locking system of claim 10, wherein the fastening surface is located radially outward of the locking washer recess, wherein the fastener further comprises at least one access hole extending from the first end to the second end of the head, the access hole being in communication with the locking washer recess.

17. A method for configuring a locking fastener assembly, comprising:
   configuring a fastener to have a threaded portion and a head having a first end and second end axially spaced from the first end, the second end comprising a fastening surface and a locking washer recess;
   configuring a locking washer to be disposed at least partially within the locking washer recess and to have a locking tab extending in a first direction away from the head of the fastener and a stop biased to move in a second direction away from the locking tab and opposing the first direction, wherein the locking tab is operable to lock rotation of the locking washer relative to an item being secured upon a torqueing rotation and a loosening rotation of the fastener, and wherein the locking washer comprises a planar upper surface adjacent the stop; and
   configuring a locking member to be supported by the fastener and operable to interface with the stop of the locking washer upon the loosening rotation of the fastener to lock the fastener relative to the item being secured.

18. The method of claim 17, further comprising:
   configuring an item to be fastened to have a locking washer stop operable to receive the locking tab.

19. The method of claim 17, wherein the fastener comprises a bolt and the threaded portion comprises a threaded shaft of the bolt, the method further comprising, forming a threaded aperture in the base to receive the bolt.

20. The method of claim 17 wherein the locking member comprises a pin, the method further comprising forming a hole in the locking washer recess sized and shaped to receive the pin and securing the pin in the hole.

* * * * *

UNITED STATES PATENT AND TRADEMARK OFFICE
CERTIFICATE OF CORRECTION

| | | |
|---|---|---|
| PATENT NO. | : 12,000,425 B2 | Page 1 of 1 |
| APPLICATION NO. | : 16/823091 | |
| DATED | : June 4, 2024 | |
| INVENTOR(S) | : Richard J. Adams | |

It is certified that error appears in the above-identified patent and that said Letters Patent is hereby corrected as shown below:

On the Title Page

In item (71), in "Applicant", in Column 1, Line 1, delete "Waltham," and insert --Tewksbury,-- therefor In the Specification In Column 1, Line 61, delete "FIG. 7," and insert --FIG. 7.-- therefor In Column 1, Line 64, delete "FIG. 8," and insert --FIG. 8.-- therefor In Column 4, Line 40, delete "22," and insert --12,-- therefor In Column 4, Line 66, delete "FIG. 3)," and insert --FIG. 3).-- therefor In Column 6, Line 1, delete "34" and insert --22-- therefor In Column 6, Line 32, delete "34" and insert --22-- therefor In Column 7, Line 17, delete "122," and insert --112,-- therefor In Column 7, Line 18, delete "reversed;" and insert --reversed,-- therefor In Column 8, Line 33, delete "134" and insert --122-- therefor In Column 8, Line 65, delete "134" and insert --122-- therefor In Column 10, Line 29, delete "details;" and insert --details,-- therefor In Column 10, Line 30, delete "materials;" and insert --materials,-- therefor Signed and Sealed this
Twenty-fifth Day of February, 2025

Coke Morgan Stewart
*Acting Director of the United States Patent and Trademark Office*